United States Patent
Kuraki et al.

(10) Patent No.: US 8,077,910 B2
(45) Date of Patent: Dec. 13, 2011

(54) DIGITAL WATERMARK EMBEDDING AND DETECTION

(75) Inventors: Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 746 days.

(21) Appl. No.: 12/109,914

(22) Filed: Apr. 25, 2008

(65) Prior Publication Data

US 2008/0205699 A1 Aug. 28, 2008

Related U.S. Application Data

(63) Continuation of application No. PCT/JP2005/019633, filed on Oct. 25, 2005.

(51) Int. Cl.
- *G06K 9/00* (2006.01)
- *G06K 9/46* (2006.01)
- *H04N 1/40* (2006.01)
- *H04L 9/32* (2006.01)

(52) U.S. Cl. ........ 382/100; 382/202; 358/3.28; 713/176

(58) Field of Classification Search .................. 382/100; 283/113; 358/3.28; 713/176
See application file for complete search history.

(56) References Cited

U.S. PATENT DOCUMENTS

| | | | |
|---|---|---|---|
| 6,983,056 B1 | 1/2006 | Amano | |
| 2002/0064308 A1* | 5/2002 | Altman et al. | 382/187 |
| 2003/0118211 A1 | 6/2003 | Eguchi et al. | |
| 2003/0149936 A1 | 8/2003 | Tamaru | |
| 2005/0025333 A1 | 2/2005 | Fujii et al. | |

FOREIGN PATENT DOCUMENTS

| | | |
|---|---|---|
| EP | 1 480 163 A2 | 11/2004 |
| JP | 2001-78006 | 3/2001 |
| JP | 2003-230001 | 8/2003 |
| JP | 2003-259112 | 9/2003 |
| JP | 2004-247883 | 9/2004 |
| JP | 2004-289783 | 10/2004 |
| JP | 2004-349879 | 12/2004 |
| JP | 2005-229186 | 8/2005 |

OTHER PUBLICATIONS

Japanese Office Action mailed on Feb. 2, 2010 and issued in corresponding Japanese Patent Application 2007-542534.
International Search Report mailed Dec. 20, 2005 in connection with the International application PCT/JP2005/019633.

* cited by examiner

*Primary Examiner* — Yubin Hung
(74) *Attorney, Agent, or Firm* — Staas & Halsey LLP

(57) ABSTRACT

Provided is a digital watermarking technology for embedding digital watermark information in text data thereby to generate a digitally watermarked image. The technology includes a digital watermarking program, a digital watermarking device and a digital watermarking method, in which digital watermark information can be embedded in document in such a way as not to be easily detected visually and be stably detected even after being printed out, copied or scanned by detecting the features of a character as data to be digitally watermarked, such as the direction and thickness of a line composing the character as the features thereof and embedding the digital watermark information in the character on the basis of the detected features.

20 Claims, 14 Drawing Sheets

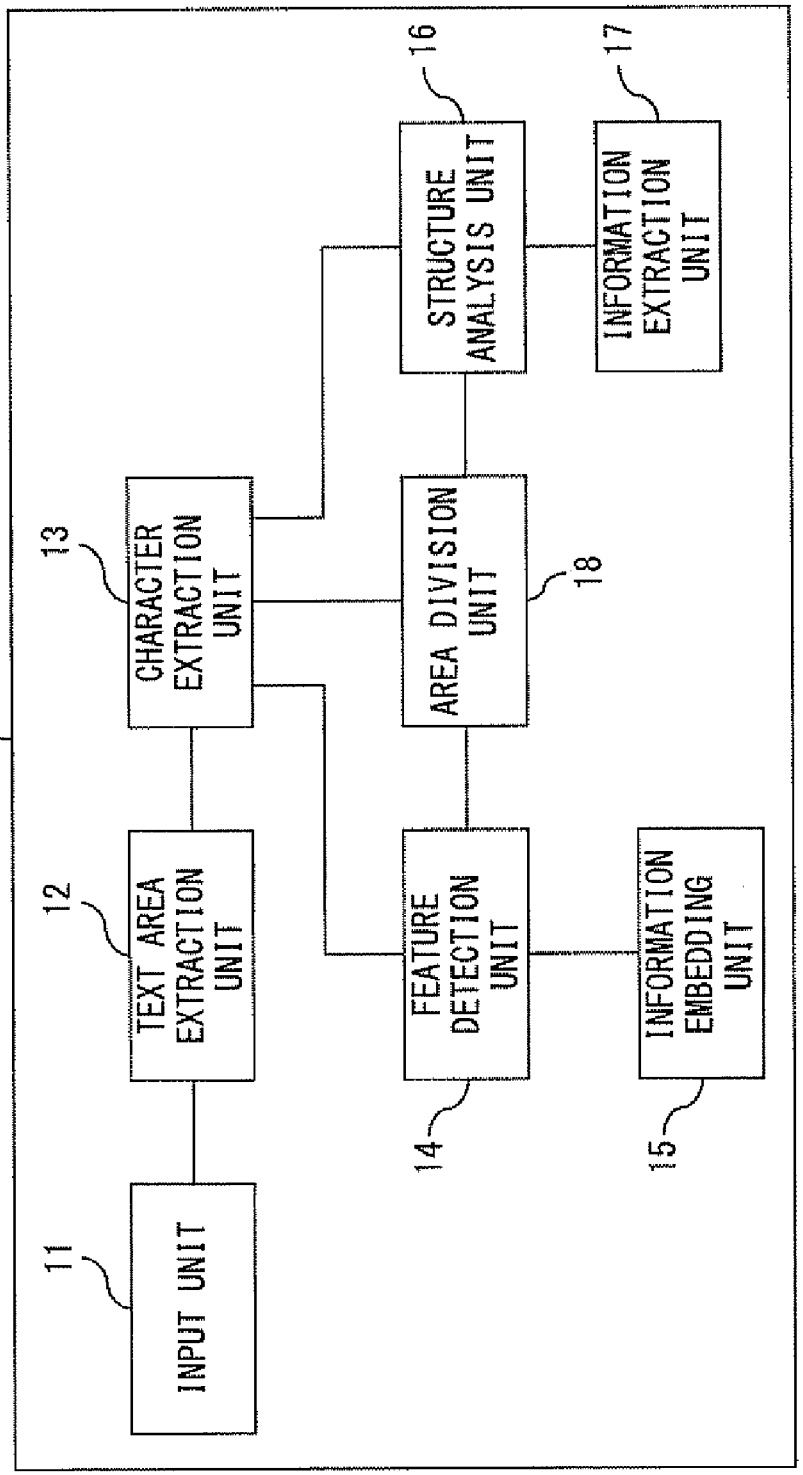
F I G. 1

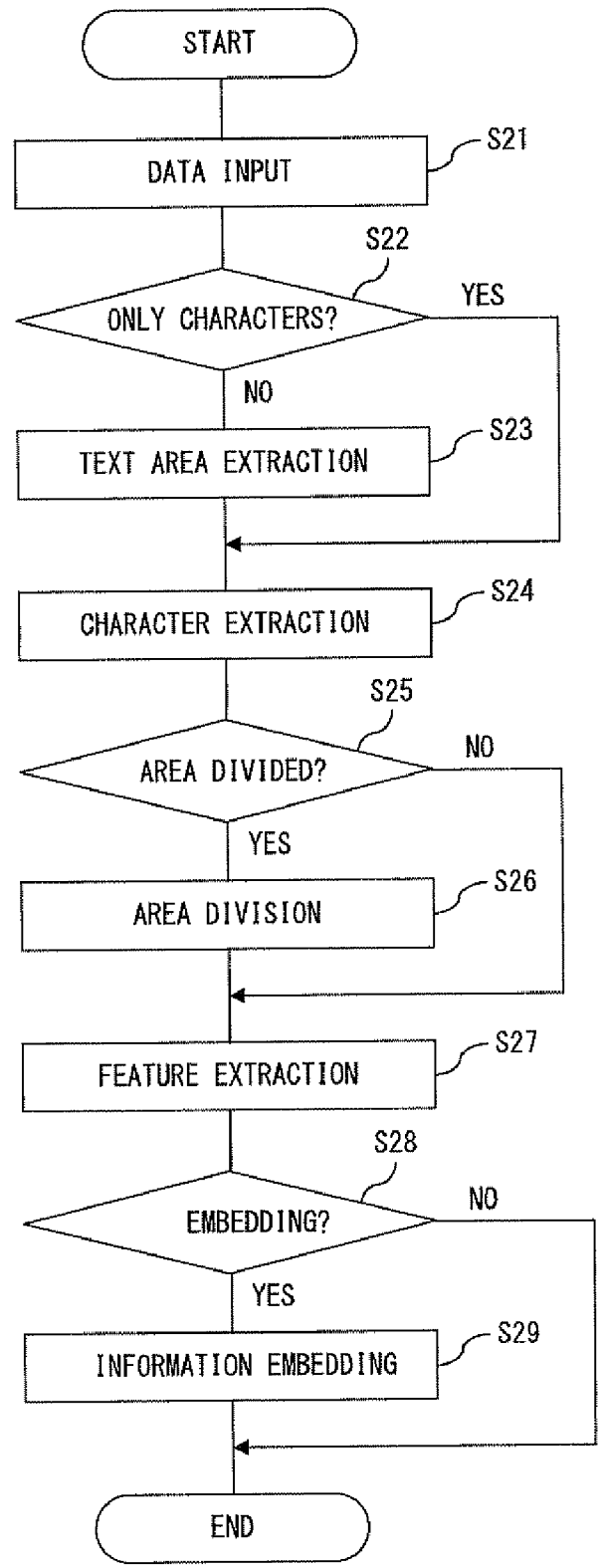
F I G. 2

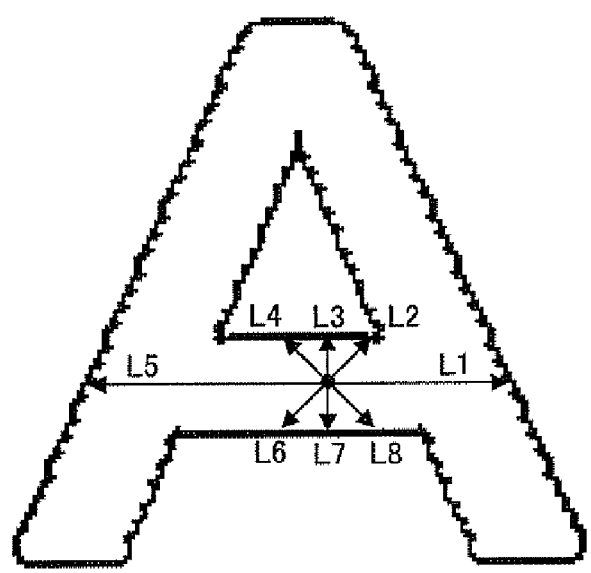
F I G. 4

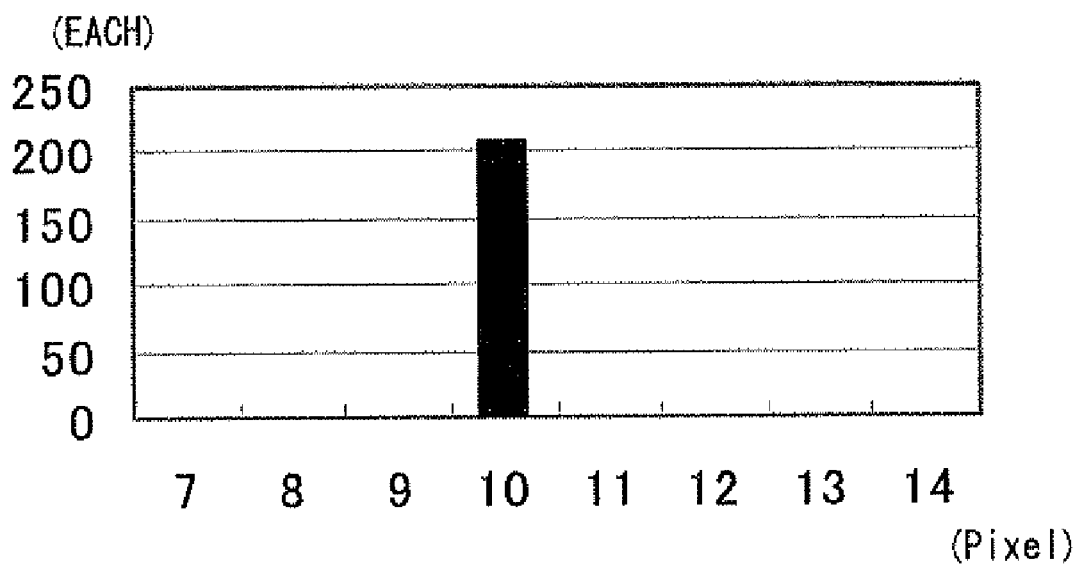
F I G. 5

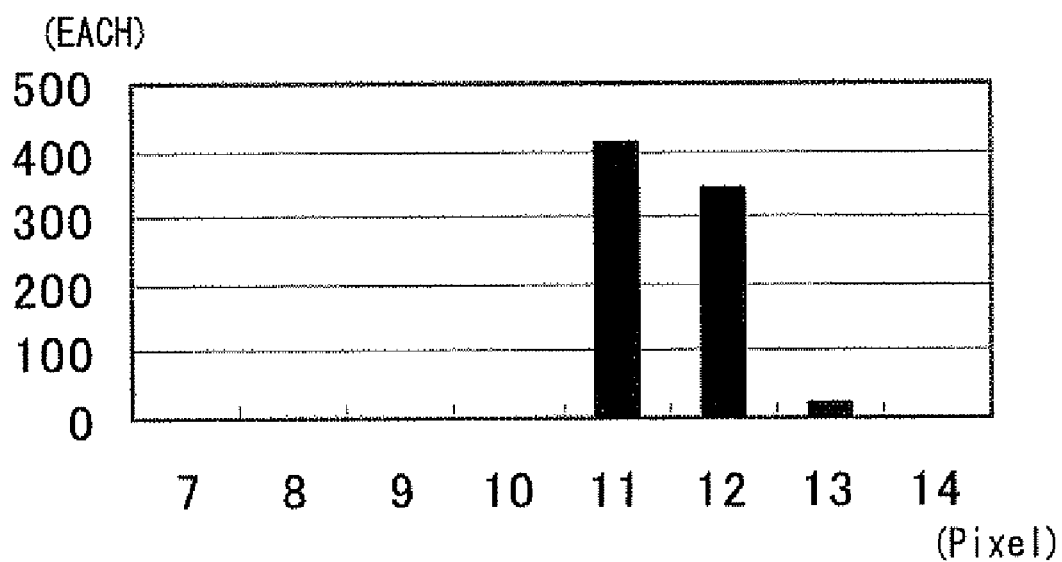
F I G. 6

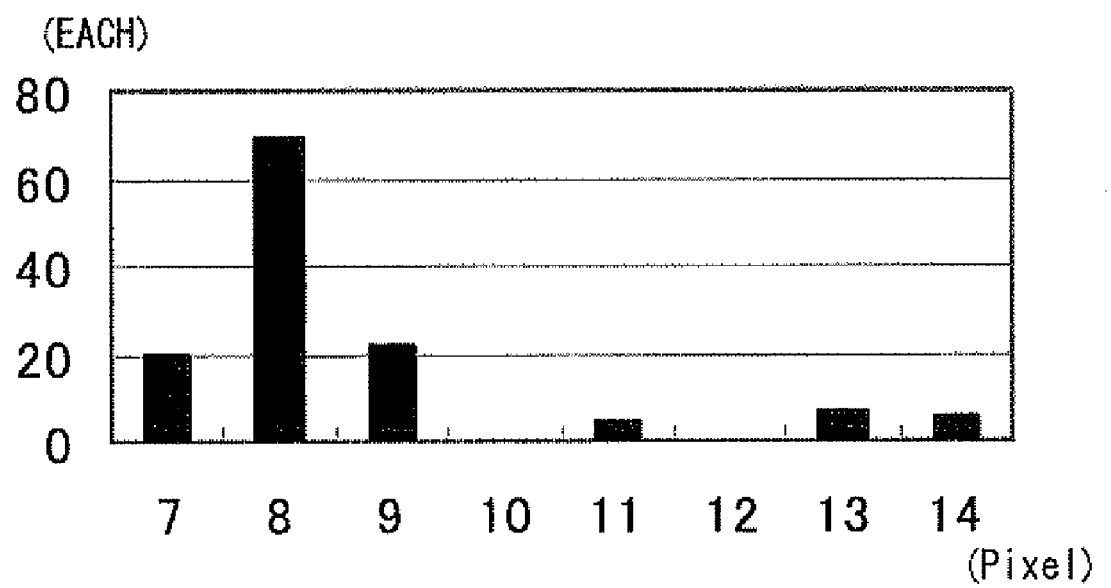
F I G. 8

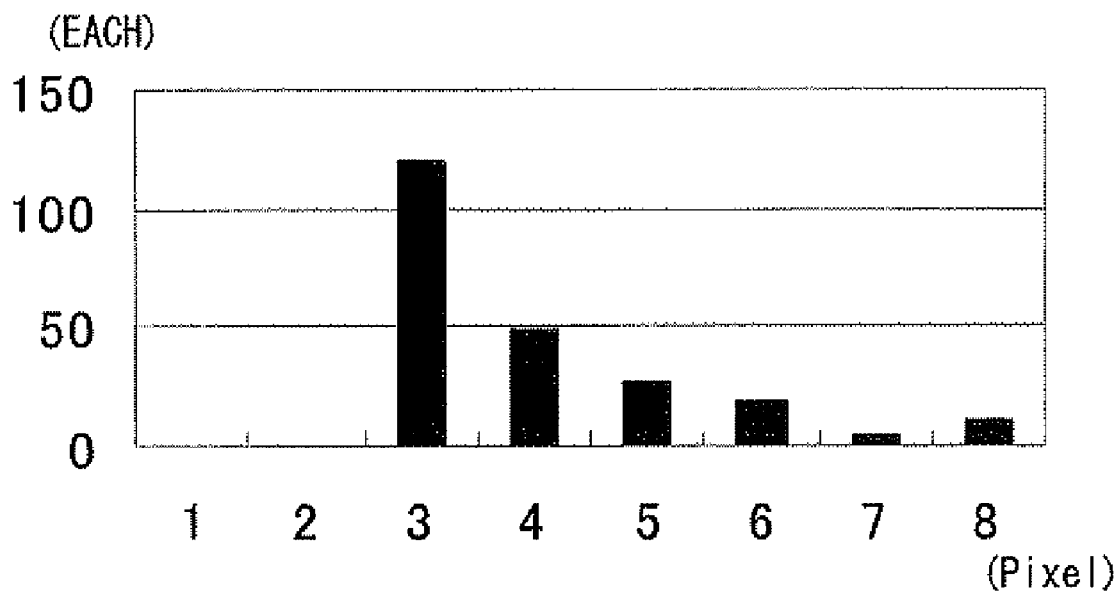
F I G. 1 0

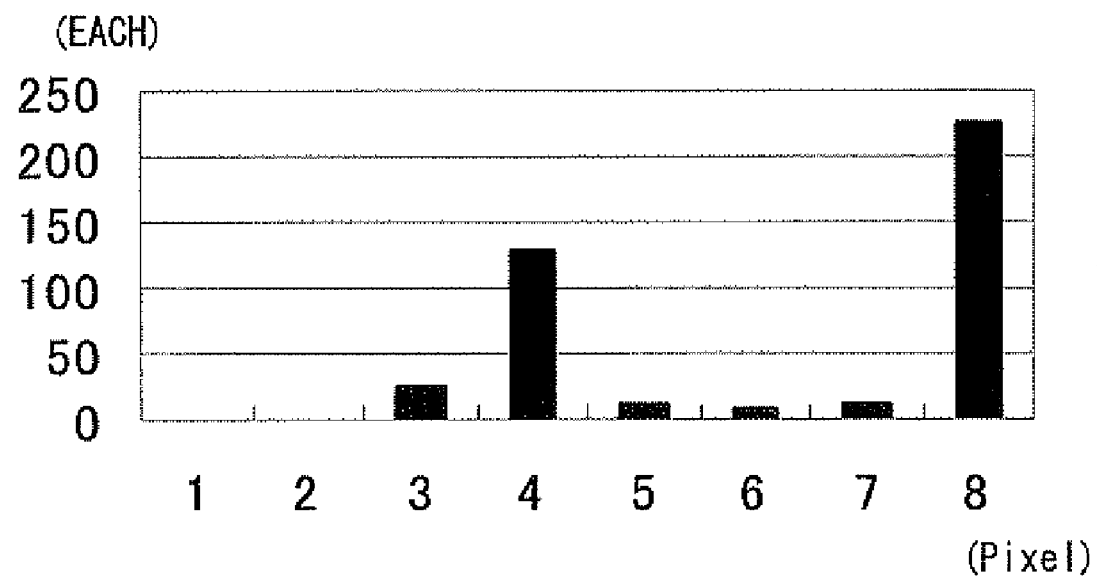
F I G. 1 1

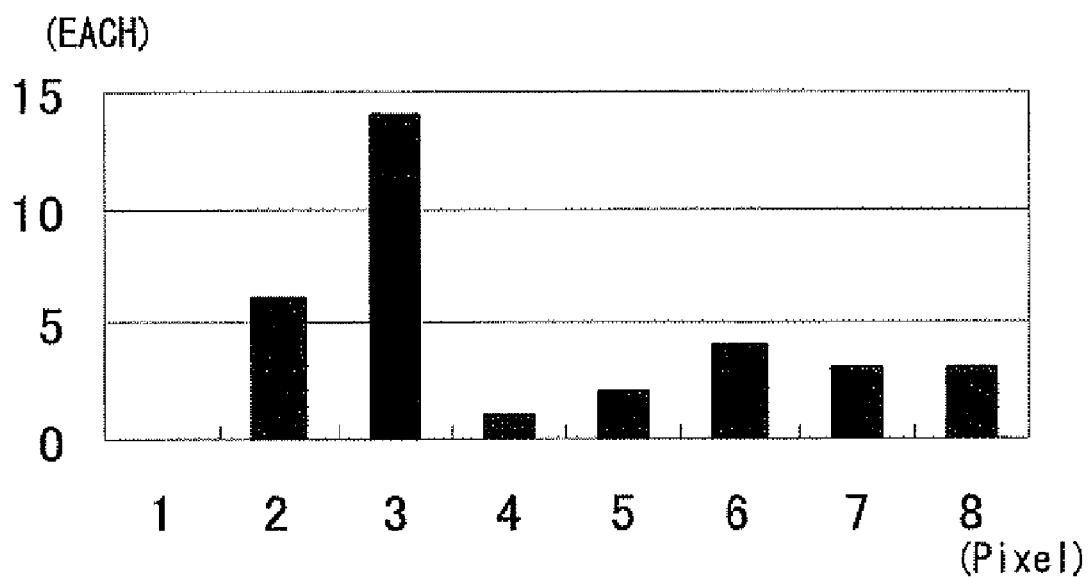
F I G. 1 2

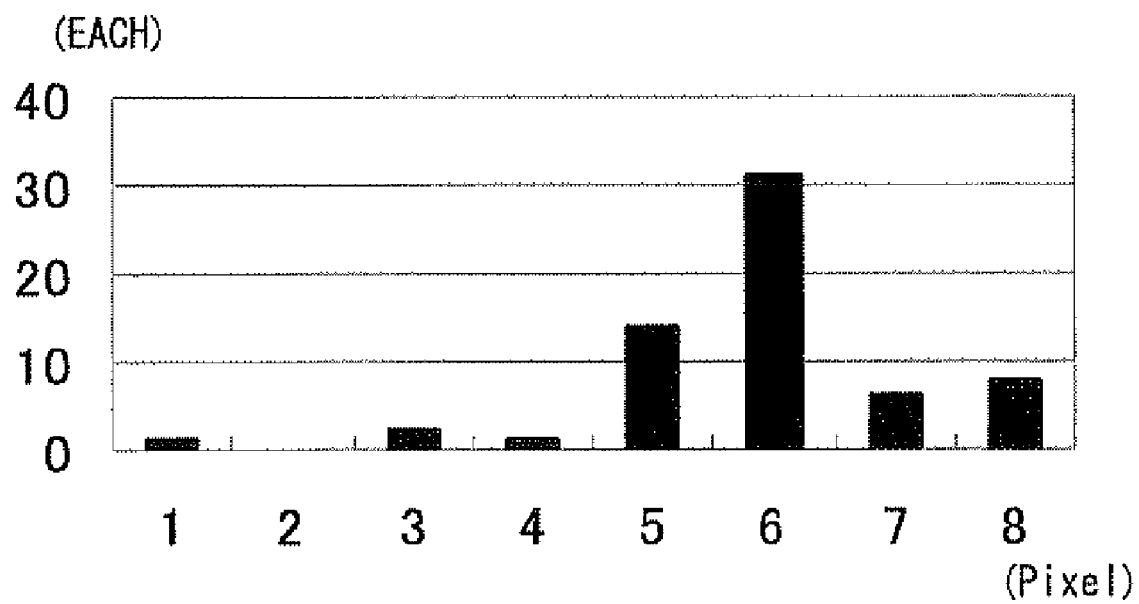
F I G. 1 3

DIGITAL WATERMARK EMBEDDING AND DETECTION

CROSS REFERENCE TO RELATED APPLICATIONS

This application is a continuation of PCT application of PCT/JP2005/019633, which was filed on Oct. 25, 2005.

BACKGROUND OF THE INVENTION

1. Field of the Invention

The present invention relates to a technology for embedding digital watermark information in document data in such a way as not to be easily detected visually, a technology for detecting embedded digital watermark information and a technology for preventing important information from being leaked from a printed paper medium.

2. Description of the Related Art

Recently, the digitalization of information stored in an organization, such as an enterprise and the like has been promoted and storage by paper is anticipated to decrease in the future. However, since it does not necessarily mean no paper document, currently, continuously generated paper and digital data are mixed as an inevitable result. On the other hand, since it is feared that private information, such as customer data handled by enterprises and public institutions and the like, is leaked, the introduction of a stricter management system is required.

As one security technology for coping with such a situation, digital watermark is used. The digital watermark is a technology for embedding information, such as the name of a copyright holder, reproduction history and the like in data, such as an image, document, voice and the like. By embedding such digital watermark information in important data handled within an organization, products provided outside an organization, information leakage and its reproduction can be prevented or the original can be assured.

For example, a technology for inserting watermark information by giving the criteria of change and its priority on the basis of a human visual characteristic against a binary image and changing a pixel with higher priority first is disclosed (for example, see Patent Document 1).

A technology for detecting watermark information by embedding watermark information by detecting a text area from a document image and increasing/decreasing the amount of features of the detected text area, or dividing the detected text area into a plurality of small sections, further dividing the small sections into two or more groups and increasing/decreasing the amount of features against each group and comparing the integrated value of the amount of features obtained from each group is disclosed (for example, see Patent Document 2).

Although as described above, the study of digital watermark for digital data is popular and various inventions are commercialized, it is difficult to extract embedded information from document data, especially a paper medium printed out once. This is because embedded information is easily lost due to position deviation, noise addition, the loss of high frequency components by resolution conversion and the like, caused when printing scanning.

Patent Document 1: Japanese Patent Publication No. 2004-289783
Patent Document 2: Japanese Patent Publication No. 2001-78006

SUMMARY OF THE INVENTION

Although traditionally the improvement of image quality and the embedding of digital watermark information can be simultaneously realized by a technique utilizing a human visual characteristic, an outline part becomes scratched and blurred when print-out and copy is repeated several times since digital watermark is embedded intensively in the outline and gap of a graphics and characters. Therefore, there is a high possibility that embedded digital watermark information may be lost, which is a problem.

Since the essential structural features of characters is not considered, detection accuracy changes depending on the design of a character in which digital watermark is embedded, which is another problem. For example, even when the same digital watermark information is embedded, Mincho font in which the thickness of a line composing a character differs depending on its part has a higher error detection rate than Gothic font in which the line thickness is uniform, which is another problem.

The present invention is made in view of such a situation and it is an object of the present invention to provide a digital watermarking program capable of embedding digital watermark information in document in such a way as not to be easily detected visually and also stably detecting the embedded digital watermark information even after is printed out, copied or scanned, its digital watermarking device and its digital watermarking method.

The present invention adopts the following configuration in order to solve the above-described problems.

Specifically, according to one aspect of the present invention, the digital watermarking program of the present invention is a computer-readable program for enabling a digital watermarking device to embed digital watermark information in text data to generate a digitally watermarked image. The digital watermarking program comprises a step of detecting the features of a character as embedding target data, a step of embedding digital watermark information in the character on the basis of the detected features.

In the digital watermarking program of the present invention it is preferable for the feature detection step to detect the direction and thickness of a line composing the character as the features of the character.

In the digital watermarking program of the present invention it is preferable for the feature detection step to detect the average or most frequently appearing value of the thickness in a prescribed direction of a line composing the character as the features of the character and for information embedding step to embed the digital watermark information by differentiating the thickness of the lines, detected by the feature detection step.

In the digital watermarking program of the present invention it is preferable for the information embedding step to adjust the thickness of the lines in many steps.

In the digital watermarking program of the present invention it is preferable for the feature detection step to detect the direction of the line using a degree of peripheral direction contributivity.

In the digital watermarking program of the present invention it is preferable for the information embedding step to determine whether to embed the digital watermark information in the character on the basis of the features detected by the feature detection step and not to embed the digital watermark information or appropriately adjust embedding strength according to the determination result.

It is preferable for the digital watermarking program of the present invention to further comprise an area division step of dividing a character as embedding target data into a plurality of areas and specifying it as embedding target data and for the feature detection step to detect the features of a character part existing in the area which is determined as embedding target data by the area division step.

In the digital watermarking program of the present invention it is preferable for the information embedding step to appropriately adjust the embedding strength of the digital watermark information to be embedded in each area divided by the area division step.

It is preferable for the digital watermarking program of the present invention to further comprise a step of inputting data in which the digital watermark information is to be embedded, a step of detecting a text area composed of characters from the embedding target data inputted by the data input step and a step of extracting the character from the text area detected by the text area detection step and for the feature detection step to specify the character extracted by the character extraction step as embedding target data and to detect the feature of the character.

According to another aspect of the present invention, the digital watermark extraction program of the present invention is a computer-readable program for enabling a digital watermark detection device to detect the digital watermark information from a digitally watermarked image in which digital watermark is embedded. The digital watermark extraction program comprises a step of inputting the digitally watermarked image, a step of detecting a text area composed of characters from the digitally watermarked image inputted by the image input step, a step of extracting the character from the text area detected by the text area detection step, a step of analyzing the features of the character extracted by the character extraction step and a step of extracting the digital watermark information embedded in the character on the basis of the features analyzed by the feature analysis step.

In the digital watermark extraction program of the present invention it is preferable for the feature analysis step to analyze the direction and thickness of a line composing the character as the features of the character.

According to another aspect of the present invention, the digital watermarking device of the present invention embeds digital watermark information in text data to generate a digitally watermarked image. The digital watermarking device comprises a feature detection unit for detecting the features of a character as embedding target data and an information embedding unit for embedding digital watermark information in the character on the basis of the features detected by the feature detection unit.

In the digital watermarking device it is preferable for the feature detection unit to detect the direction and thickness of a line composing the character as the features of the character.

In the digital watermarking device it is preferable for the feature detection unit to detect the average or most frequently appearing value of the thickness in a prescribed direction of the line as the features of the character and for information embedding unit to embed the digital watermark information by differentiating the thickness of the lines, detected by the feature detection unit.

In the digital watermarking device it is preferable for the information embedding unit to adjust the thickness of the line in many steps.

In the digital watermarking device it is preferable for the feature detection unit to detect the direction of the line using a degree of peripheral direction contributivity.

In the digital watermarking device it is preferable for the information embedding unit to determine whether to embed the digital watermark information in the character on the basis of the features detected by the feature detection unit, and not to embed the digital watermark information or appropriately adjust embedding strength according to the determination result.

It is preferable for the digital watermarking device of the present invention to further comprise an area division unit for dividing a character as embedding target data into a plurality of areas and specifying it as embedding target data and for the feature detection unit to detect the features of a character part existing in the area, which is determined as embedding target data by the area division unit.

In the digital watermarking device of the present invention it is preferable for the information embedding unit to appropriately adjust the embedding strength of the digital watermark information to be embedded in each area divided by the area division unit.

It is preferable for the digital watermarking device of the present invention to further comprise a data input unit for inputting data in which the digital watermark information is to be embedded, a text area detection unit for detecting a text area composed of characters from the embedding target data inputted by the data input unit and a character extraction unit for extracting the character from the text area detected by the text area detection unit and for the feature detection unit to specify the character extracted by the character extraction unit as embedding target data and to detect the feature of the character.

According to another aspect of the present invention, the digital watermark detection device of the present invention detects the digital watermark information from a digitally watermarked image in which digital watermark is embedded. The digital watermark detection device comprises an image input unit for inputting the digitally watermarked image, a text area detection unit for detecting a text area composed of characters from the digitally watermarked image inputted by the image input unit, a character extraction unit for extracting the character from the text area detected by the text area detection unit, a feature analysis unit for analyzing the features of the character extracted by the character extraction unit and an information extraction unit for extracting the digital watermark information embedded in the character on the basis of the features analyzed by the feature analysis unit.

In the digital watermark detection unit of the present invention it is preferable for the feature analysis unit to analyze the direction and thickness of a line composing the character as the features of the character.

According to another aspect of the present invention, the digital watermarking method embeds digital watermark information in text data to generate a digitally watermarked image in the digital watermarking device comprises detecting the features of a character as embedding target data and embedding digital watermark information in the character on the basis of the detected features.

It is preferable for the digital watermarking method to detect the direction and thickness of a line composing the character as the features of the character.

According to another aspect of the present invention, the digital watermark extraction method detects the digital watermark information from a digitally watermarked image in which digital watermark is embedded in the digital watermark detection device comprises inputting the digitally watermarked image, detecting a text area composed of characters from the inputted digitally watermarked image, extracting the character from the detected text area, analyzing digital watermark information embedded in the character.

It is preferable for the digital watermarking method to analyze the direction and thickness of a line composing the character as the features of the character.

BRIEF DESCRIPTION OF THE DRAWINGS

FIG. 1 is the functional block diagram of the digital watermarking device of the present invention.

FIG. 2 is a flowchart showing the flow of the digital watermarking process of the present invention.

FIG. 4 shows an example of a Gothic character.

FIG. 5 shows an example of the histogram in the horizontal direction of a Gothic character.

FIG. 6 shows an example of the histogram in the vertical direction of a Gothic character.

FIG. 8 shows an example of the histogram in the left oblique direction of a Gothic character.

FIG. 10 shows an example of the histogram in the horizontal direction of the Mincho character.

FIG. 11 shows an example of the histogram in the vertical direction of a Mincho character.

FIG. 12 shows an example of the histogram in the right oblique direction of a Mincho character.

FIG. 13 shows an example of the histogram in the left oblique direction of a Mincho character.

DESCRIPTION OF THE PREFERRED EMBODIMENTS

Figure 3:
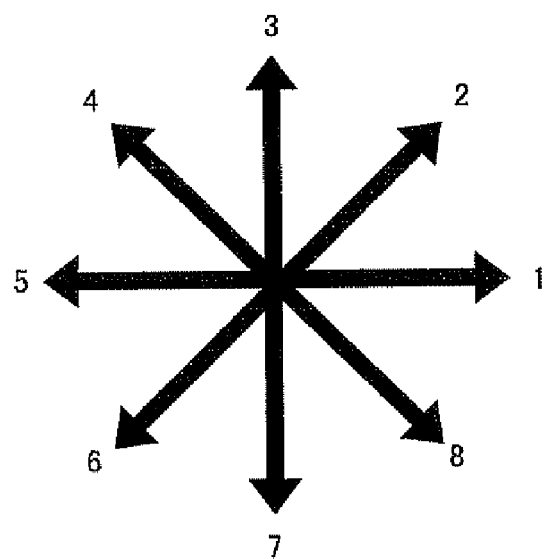
FIG. 3 shows the direction of tentacles.

The preferred embodiments of the present invention are described below with reference to the drawings.

Firstly, the summary of the present invention is described.

The present invention is a digital watermarking device for embedding digital watermark information in text data to generate a digitally watermarked image, a computer-readable digital watermarking program to be executed by the digital watermarking device or a digital watermarking method to be implemented in the digital watermarking device.

In the embedding of digital watermark information firstly a character area is extracted from data including document information by structural analysis. One character or a plurality of characters is extracted from the extracted character area. The amount of features of the extracted character is extracted and analyzed. It is determined whether to embed digital watermark information on the basis of this analysis result. If the digital watermark information is embedded, the features of the character are operated. For example, digital watermark information is embedded in such a way as to be resistant against resolution conversion and the like using the ratio of an amount of features.

In the extraction of digital watermark information firstly a character area is extracted from data including document information by structural analysis. One character or a plurality of characters is extracted from the extracted character area. The amount of features of the extracted character is extracted and analyzed. It is determined whether digital watermark information is embedded on the basis of this analysis result. If the digital watermark information is embedded, the embedded digital watermark information is extracted.

Since by embedding and extracting digital watermark information as described above, the structural features of a character are analyzed, information embedding accuracy does not depend on the design and the like of the character and is stable. Since the structural features of a character are operated, digital watermark information is less lost compared with a technology for operating an amount of local features, such as the shape of its outline and the like.

FIG. 1 is the functional block diagram of the digital watermarking device of the present invention.

In FIG. 1 reference Nos. 1, 11, 12, 13, 14, 15, 16, 17 and 18 indicate a digital watermarking device, an input unit, a text area extraction unit, a character extraction unit, a feature detection unit, an information embedding unit, a structure analysis unit, an information extraction unit and an area division unit, respectively.

The digital watermarking device 1 embeds digital watermark information in text data to generate a digitally watermarked image or detects the digital watermark information from the digitally watermarked image in which digital watermark information is embedded. The digital watermarking device 1 comprises an input unit 11, a text area extraction unit 12, a character extraction unit 13, a feature detection unit 14, an information embedding unit 15, a structure analysis unit 16, an information extraction unit 17 and an area division unit 18.

The digital watermarking device 1 functions as a digital watermarking device for embedding digital watermark information in text data to generate a digitally watermarked image by being comprised of the input unit 11, the text area extraction unit 12, the character extraction unit 13, the feature detection unit 14, the information embedding unit 15 and the area division unit 18 and functions as a digital watermark extraction device for detecting the digital watermark information from a digitally watermarked image in which digital watermark information is embedded by being comprised of the input unit 11, the text area extraction unit 12, the character extraction unit 13, the structure analysis unit 16, the information extraction unit 17 and the area division unit 18.

When the digital watermarking device 1 functions as a digital watermarking device, the input unit 11 inputs embedding target data in which digital watermark information is to be embedded. The text area extraction unit 12 detects a text area composed of characters from the embedding target data inputted by the input unit 11. The character extraction unit 13 extracts the character from the text area detected by the text area detection unit 12.

The feature detection unit 14 specifies a character as embedding target data, such as the character extracted by the character extraction unit 13 as embedding target data and detects the features of the character. Then, the information embedding unit 15 embeds digital watermark information in the character on the basis of the features detected by the feature detection unit 14, such as the direction and thickness of a line composing the character.

More specifically, digital watermark information is embedded, for example, by the feature detection unit 14 detecting the average or most frequently-appearing values of a thickness in a prescribed direction of a line as the features of the character and the information embedding unit 15 differentiating the thickness of the line, detected by the feature detection unit 14.

In the feature detection by the feature detection unit 14 the direction of the line is detected using a degree of peripheral direction contributivity.

The information embedding unit 15 can also adjust the thickness of a line in many steps, determine whether to embed digital watermark information in the character on the basis of the features detected by the feature detection unit 14 and stop embedding digital watermark information or appropriately adjust its embedding strength according to the determination result.

The area division unit 18 divides a character as embedding target data into a plurality of areas and specifies them as embedding target data. In this case the feature detection unit 14 detects the features of a character part existing in the area specified as embedding target data by the area division unit 18. Then, the information embedding unit 15 appropriately adjusts the embedding strength of digital watermark information to be embedded of each area divided by the area division unit 18.

On the other hand, when the digital watermarking device 1 functions as a digital watermark extraction device, the input unit 11 inputs a digitally watermarked image. The text area detection unit 12 detects a text area composed of characters from the digitally watermarked image inputted by the input unit 11. The character extraction unit 13 extracts a character from the text area detected by the text area detection unit 12.

The structure analysis unit 16 analyzes the features of the character extracted by the character extraction unit 13. The information extraction unit 17 extracts digital watermark information embedded in the character on the basis of the features analyzed by the feature analysis unit 16, such as the direction and thickness of a line composing the character.

Next, the embedding and extraction methods of digital watermark information by the digital watermarking device 1 with the above-described configuration are described.

Firstly, the embedding method of digital watermark information by the digital watermarking device 1 is described.

FIG. 2 is a flowchart showing the flow of the digital watermarking process of the present invention.

In FIG. 2, steps S21, S22, S23, S24, S25, S26, S27, S28 and S29 indicate "data input", "only characters?", "text area extraction", "character extraction", "area divided?", "area division", "feature extraction", "embedded?" and "information embedding", respectively.

Firstly, in step S21 the input unit 11 reads image data, input data including document information, such as portable document format (PDF), and the like, document data in which graphics and characters are mixed, such as document written by a word processor and the like or image data, such as bit map (BMP) data and joint photographic experts group (JPEG) data and the like which are read by a scanner as embedding target data in which digital watermark information is embedded and simultaneously inputs watermark information to be embedded. Then, in step S22 it is determined whether the data inputted in step S21 is composed of only characters or it also includes image data.

If in step S22 it is determined that the data is composed of only characters (Yes in step 822), the flow proceeds to step S24 and the character extraction unit 13 extracts a character part from the read input data. Specifically, characters are extracted using layout information possessed by the input data and after that they are handled as images, such as BMP one or the like. It can be also JPEG data or data in other image format. If in step S22 it is determined that the input data is not only characters and also includes image data (document data) (No in step S22), in step S23 a text area is extracted from the document data by structure analysis conducted by the text area extraction unit 12 and the character extraction unit 13 extracts a character part from the extracted text area every character. Alternatively, a plurality of characters can be simultaneously extracted.

Then, in step S25 it is determined whether the character extracted in step S24 is divided into a plurality of areas. If it is divided (Yes in step S25), in step S26 the character extracted in step S24 is divided into a plurality of areas and the flow proceeds to step S27.

If it is not divided (No in step S25), in step S27 the feature detection unit 14 analyzes the structure of the character extracted in step S24 to detect features. For example, the direction and thickness of a line composing the character is detected as the features of the character. When in step S26 the character is divided into a plurality of areas, the direction and thickness of a line composing a part of the character existing in the divided area is detected as the features of the character.

Here a method for extracting the direction of a line composing a character and its thickness for each direction is described.

FIG. 3 shows the direction of tentacles.

Firstly, the extracted character image is raster-scanned to calculate the jointed length of pixels in eight directions as shown in FIG. 3. Then, the jointed length in the horizontal direction, that in the 45-degree right oblique direction, that in the vertical direction and that in the 45-degree left oblique direction are calculated on the basis of the jointed length in eight directions as follows.

$$\text{Horizontal direction: } d1 = L1 + L5 \quad (1)$$

$$\text{45-degree right oblique direction: } d2 = L2 + L6 \quad (2)$$

$$\text{Vertical direction: } d3 = L3 + L7 \quad (3)$$

$$\text{45-degree left oblique direction: } d4 = L4 + L8 \quad (4)$$

L1 through L8 are the jointed length of black points obtained by extending tentacles in eight directions shown in FIG. 3 from a focused pixel.

Then, a degree of peripheral direction contributivity D1 through D4 is calculated on the basis of the jointed length d1 through d4 as follows.

$$D1 = d1/(d1^2 + d2^2 + d3^2 + d4^2)^{1/2} \quad (5)$$

$$D2 = d2/(d1^2 + d2^2 + d3^2 + d4^2)^{1/2} \quad (6)$$

$$D3 = d3/(d1^2 + d22 + d3^2 + d4^2)^{1/2} \quad (7)$$

$$D4 = d4/(d1^2 + d2^2 + d3^2 + d4^2)^{1/2} \quad (8)$$

Here this is described using an example.

FIG. 4 shows an example of a Gothic character.

If the degree of peripheral direction contributivity D1 through D4 is calculated when tentacles are extended in eight directions from a focused pixel in a character component as shown in FIG. 4, the degree of peripheral direction contributivity D1 becomes the maximum. In this case the focused pixel is one of the pixels composing a line in the horizontal direction. Furthermore, the thickness of the line in the horizontal direction including the focused pixel becomes L3+L7+1. The above-described process is applied to all the pixels composing a character whose pixel value is 0 (black) to analyze them statistically. In this preferred embodiment, the histogram of thickness is generated for each direction of a line composing a character.

Figure 7:
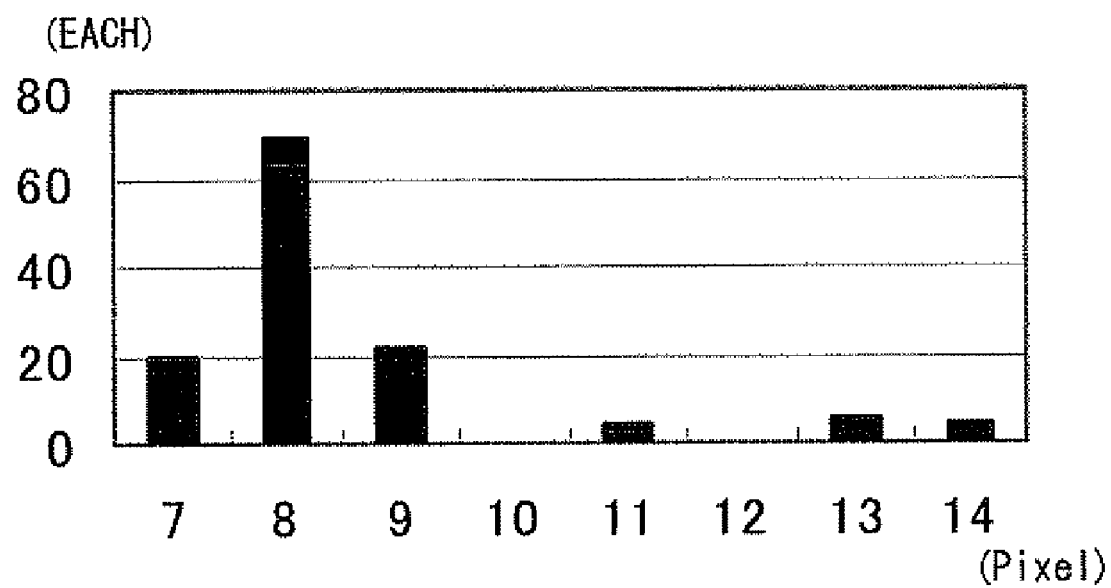
FIG. 7 shows an example of the histogram in the right oblique direction of a Gothic character.

FIG. 5 shows an example of the histogram in the horizontal direction of a Gothic character. FIG. 6 shows an example of the histogram in the vertical direction of a Gothic character. FIG. 7 shows an example of the histogram in the right oblique direction of a Gothic character. FIG. 8 shows an example of the histogram in the left oblique direction of a Gothic character.

Then, the average, most frequently appearing value for each direction or the like is calculated as an amount of features on the basis of the histogram generated thus.

In this preferred embodiment the most frequently appearing value is used. For example, if the ratio c (=a/b) between the two values is larger than an arbitrary threshold e (c>e) then the initial state of the character is set to "0" when the most frequently appearing value of thickness in the horizontal and vertical directions are a and b, respectively. If the ratio c (=a/b) between the two values is equal to or smaller than an arbitrary threshold e (c≦e) then the initial state of the character is set to "1". In this way the initial state of an extracted character (state before embedding information) is calculated.

Alternatively, a ratio of line thickness in an oblique direction can be used for the feature detection. Furthermore, the states of four patterns of "00", "01", "10" and "11" of one character can be also discriminated by combining a ratio of that between the horizontal and vertical directions with a ratio of that between 45-degree right and left oblique directions.

This applies to not only a Gothic font but also a Mincho font.

Figure 9:
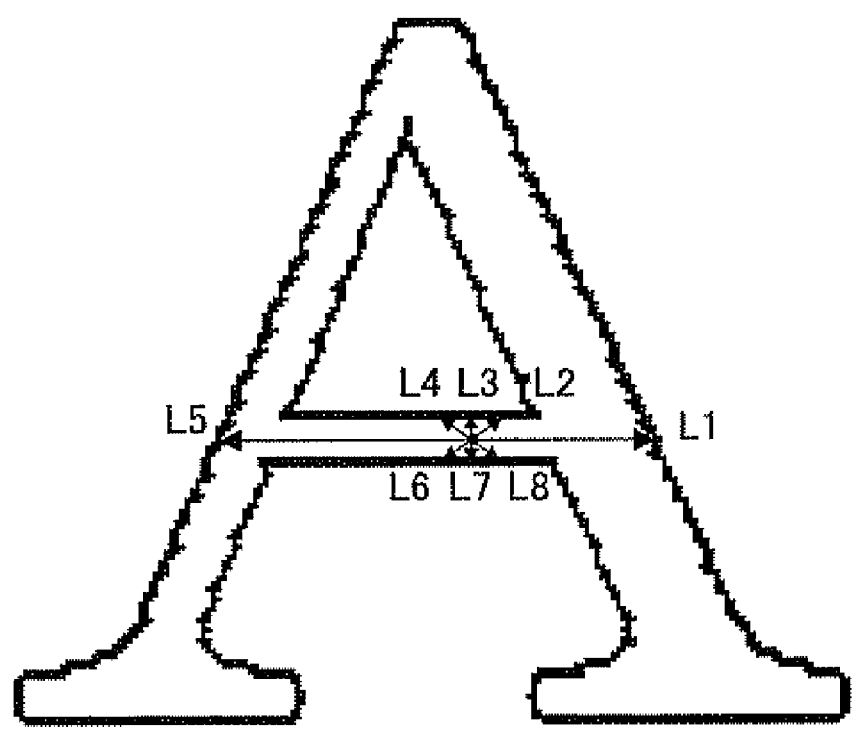
FIG. 9 shows an example of a Mincho character.

FIG. 9 shows an example of a Mincho character. FIG. 10 shows an example of the histogram in the horizontal direction of the Mincho character. FIG. 11 shows an example of the histogram in the vertical direction of a Mincho character. FIG. 12 shows an example of the histogram in the right oblique direction of a Mincho character. FIG. 13 shows an example of the histogram in the left oblique direction of a Mincho character.

Description returns to FIG. 2.

After in step S27 the features of a character are detected, in step S28 it is determined whether to embed the digital watermark information in the character on the basis of the detected features.

If in step S28 it is determined that it is embedded (Yes in step S28), in step S29 the information embedding unit 15 embeds digital watermark information using the features detected in step S27 and the initial state of a character. For example, if digital watermark information to be embedded and the initial state of a character are "1" and "0", respectively, the amount of features of a character is operated in such a way that c≦e. In this case it is operated in such a way that the line thickness in the horizontal direction of a character becomes thin or that that in the vertical direction becomes thick. Depending on the determination result sometimes the digital watermark information is not embedded and sometimes its embedding strength is appropriately adjusted. For example, when information to be embedded and the initial state of a character is the same, no process is performed. When image quality widely deteriorates for example, a line becomes too thin by operating its amount of features, no information can be embedded.

If in step S26a character is divided into a plurality of areas, only the amount of features of some of them can be also operated instead of the amount of features of a whole character. Alternatively, a ratio of line thickness between oblique directions can be used for digital watermark information embedding as in the feature detection. The information of four patterns of "00", "01", "10" and "11" of one character can be also embedded by combining a ratio of that between the horizontal and vertical directions with a ratio of that between 45-degree right and left oblique directions. Furthermore, besides in order to improve the extraction accuracy of digital watermark information which is described later, the same digital watermark information can be also repeatedly embedded or an error correction code and the like can be also used.

In step S26, for example, an area enclosed by the circumscribed rectangle of a character can be divided into M×N areas. In this case, in the feature detection of step S27 line thickness in four directions (horizontal, vertical, 45-degree right and left oblique directions) for each divided area is statistically analyzed using their histograms. Then, when the line thickness in the four or two specific (horizontal and vertical or 45-degree light and left oblique) directions detected in a specific divided area in step S29 is almost the same, digital watermark information is embedded in that divided area appropriately changing its embedding strength. How much the embedding strength is changed is determined on the basis of the detected line thickness. For example, the thicker a line is, the greater its embedding strength is made. The thinner a line is, the smaller its embedding strength is made. By embedding in a part easy to embed collectively the extraction accuracy of digital watermark information can be improved and also the deterioration of a character can be suppressed.

Next, the extraction method of digital watermark information by the digital watermarking device 1 is described.

Figure 14:
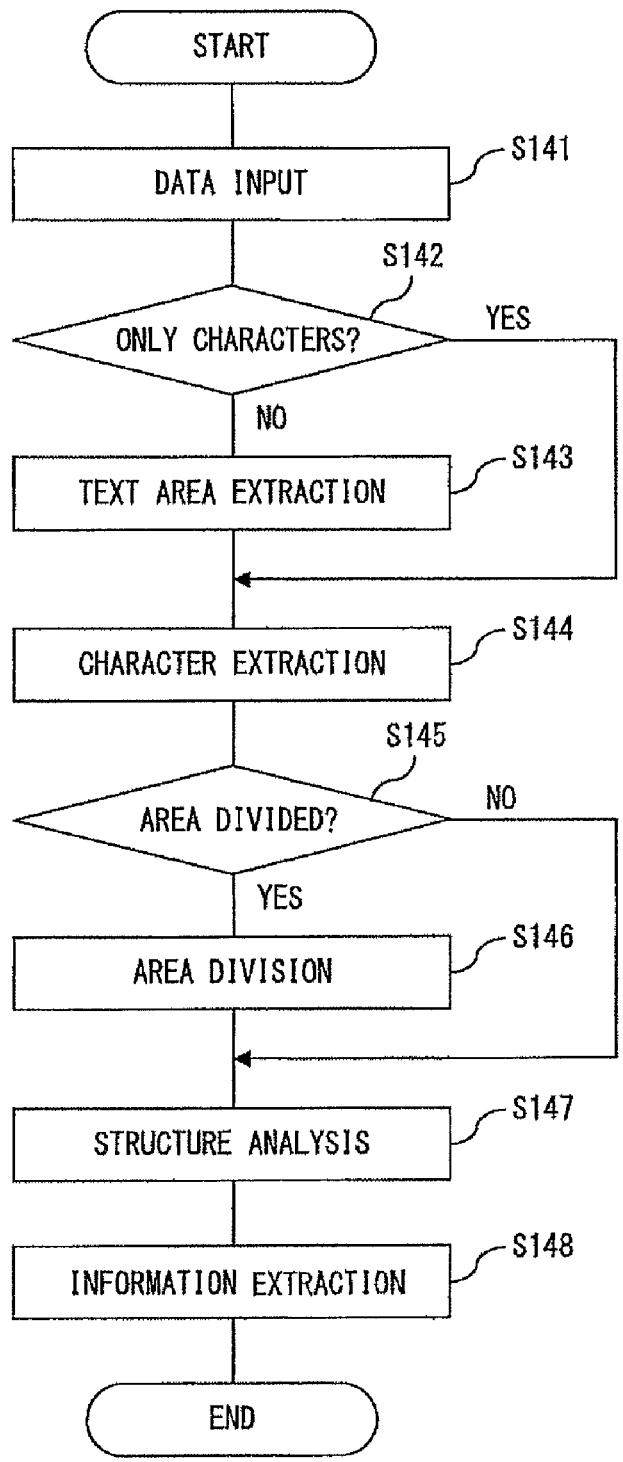
FIG. 14 is a flowchart showing the flow of the digital watermark extraction process of the present invention.

FIG. 14 is a flowchart showing the flow of the digital watermark extraction process of the present invention.

In FIG. 14 steps S141, S142, S143, S144, S145, S146, S147 and 3148 indicate "data input", "only character?", "text area extraction", "character extraction", "area divided?", "area division", "structural analysis" and "information extraction", respectively.

Firstly, in step S141 the input unit 11 reads image data, such as BMP and JPEG data in which digital watermark is embedded and the like by scanning using a scanner or the like. Then, in step S142 it is determined whether the data inputted in step S141 is composed of only characters or also includes image data.

If it is determined that it is composed of only characters (Yes in step S142), the flow proceeds to step S144 and the character extraction unit 13 extracts a character part from the read input data. Specifically, a character is extracted using layout information possessed by the input data and the data is handled as an image, such as BMP one and the like in subsequent processes. The data can be also JPEG one or ones in other image format. If it is determined that it id document data including not only characters but also image data (No in step S142), in step S143 a text is extracted from the document data by structural analysis conducted by the text area extraction unit 12 and the character extraction unit 13 extracts a character part from the extracted text area every character. Alternatively, a plurality of characters can be simultaneously extracted.

Then, in step S145 it is determined whether the extracted character should be divided into a plurality of areas. If it is divided (Yes in step S145), in step S146 the character extracted in step S144 is divided into a plurality of areas and the flow proceeds to step S147.

If it is not divided (No in step S145), in step S147 the structure analysis unit 16 detects features as the feature extraction unit 14 detects the features of a character in step S27 of FIG. 2. For example, the direction and thickness of a line composing a character is detected as the features of the character. If a character is divided into a plurality of areas in step S146, the direction and thickness of a line composing a part of the character existing in the divided area are detected as the features of the character.

Then, in step S148 the information extraction unit 17 extracts digital watermark information embedded in the character extracted from the histogram generated by the structure analysis unit 16. For example, the average, most frequently appearing value or the like of thickness in each direction is calculated on the basis of the histogram. In this preferred embodiment, the most frequently appearing value is used as the amount of features. A case where the most frequently appearing value of line thickness in the horizontal and vertical directions are a and b, respectively is considered. In this case, for example, if a ratio c (=a/b) between two values is larger than an arbitrary threshold e (c>e), it is determined that embedded information is "0". If a ratio c (=a/b) between two values is equal to or smaller than an arbitrary threshold e (c≦e), it is determined that embedded information is "1".

Although the preferred embodiments of the present invention have been described above, for example, "0" or "1" can be also attached to the last raster-scanned dot of each character. In this case, digital watermark information can be embedded in such a way as not to be easily detected visually and be stably detected after the embedded digital watermark information is printed out, copied or scanned.

The above-described preferred embodiments of the present invention can be realized by hardware, firmware, such as a DSP board, a CPU board, or software as one function of the digital watermarking device.

Although the preferred embodiments of the present invention have been described above, as long as the function is carried out, the digital watermarking device of the present invention is not limited to the above-described preferred embodiments and it can be a single device, a system or incorporated device composed of a plurality of devices, or a system in which a process is performed via a network, such as LAN, WAN or the like.

The preferred embodiments of the present invention can be also realized by a system comprising a CPU, memory, such as ROM and RAM, an input device, an output device, an external storage device, a medium drive device and a network connection device which are all connected to a bus. Specifically, the preferred embodiments of the present invention can be also realized by providing the digital watermarking device with memory, such as RON and RAM, an external storage device or a portable storage medium on which software program codes for realizing the above-described preferred embodiment systems and enabling the computer of the digital watermarking device to read and execute the program codes.

In this case, the program codes themselves read from the portable storage medium or the like realizes the new function of the present invention and the digital watermarking device on which the program codes are recorded also constitutes the present invention.

For the portable storage medium for providing the program codes, a flexible disk, a hard disk, an optical disk, a magneto-optical disk, CD-ROM, CD-R, DVD-ROM, DVD-RAM, a magnetic tape, a non-volatile memory card, a RON card, various storage media on which are recorded the program codes via the network connection device (in other words, communication line), such as electronic mail, personal computer communications or the like can be used.

The function of the above-described preferred embodiments can be realized by executing the program codes read on the memory by a computer (information processing device). Besides, the function of the above-described preferred embodiments can be also realized by enabling OS or the like run on a computer to perform a part or all of the actual processes according to the instructions of the program codes.

Furthermore, the function of the above-described preferred embodiments can be realized by enabling a CPU provided for a function extension board inserted into a computer or a function extension unit connected to a computer to perform a part or all of the actual processes according to the instructions of program codes after program codes read from the portable storage medium or programs (data) provided by a program (data) provider are written into the function extension board or the function extension unit.

Specifically, the present invention is not limited to the above-described preferred embodiments and can take various configurations or shapes as long as the subject matter of the present invention is not deviated.

What is claimed is:

1. A non-transitory computer-readable medium storing a digital watermarking program for enabling a computer to embed digital watermark information in text data to generate a digitally watermarked image, the program causing the computer to execute a method comprising:
    detecting local line thickness at each pixel on lines composing a character from embedding target data with respect to each of a predetermined set of the directions;
    determining character line thickness for said character with respect to each of said predetermined set of the directions from said local line thickness as features of said character; and
    embedding digital watermark information in said character by using a ratio of character line thicknesses for said character in at least two of said predetermined set of directions.

2. The computer-readable medium according to claim 1, wherein said determining determines, for each direction, an average local line thickness or the most frequently appearing local line thickness in said direction for use as character line thickness in said direction, and
    wherein said embedding embeds the digital watermark information by adjusting the thickness of the lines of said character that are of said at least two directions.

3. The computer-readable medium according to claim 2, wherein said adjusting is carried out in more than one step.

4. The computer-readable medium according to claim 1, wherein said detecting detects direction each of said lines using a degree of peripheral direction contributivity.

5. The computer-readable medium according to claim 1, wherein said embedding determines whether to embed the digital watermark information in the character on a basis of features detected by said detecting, and stops embedding the digital watermark information or adjusts embedding strength, depending on the determination result.

6. The computer-readable medium according to claim 1, the method further comprising an area division step of dividing said character into a plurality of areas and specifying the plurality of areas as embedding target data, and
    wherein said detecting and determining determine features of a character part existing in each of the plurality areas specified as embedding target data by the area division step.

7. The computer-readable medium according to claim 6, wherein said embedding adjusts embedding strength of the digital watermark information to be embedded in each area divided by the area division step.

8. The computer-readable medium according to claim 1, the method further comprising:
    inputting embedding target data in which the digital watermark information is to be embedded;
    detecting a text area composed of characters from embedding target data inputted by the data input step; and
    extracting a character from the text area detected, and
    wherein said detecting and determining determine features of the character extracted by said extracting.

9. A non-transitory computer-readable medium storing a digital watermark extraction program for enabling a computer to detect the digital watermark information from a digitally watermarked image in which digital watermark information is embedded, the program causing the computer to execute a method comprising:
inputting the digitally watermarked image;
detecting a text area composed of characters from a digitally watermarked image inputted by said inputting;
extracting a character from the text area detected by said detecting;
analyzing said character to obtain directions of lines composing said character and character line thickness of said character with respect to each of said directions; and
extracting digital watermark information embedded in the character by calculating a ratio of the character line thicknesses of said character with respect to at least two of said directions.

10. A digital watermarking device for embedding digital watermark information in text data to generate a digitally watermarked image, comprising:
a feature detection unit for detecting local line thickness at each pixel on lines composing a character from embedding target data with respect to each of a predetermined set of the directions and for determining character line thickness for said character with respect to each of said predetermined set of the directions from said local line thickness as features of said character; and
an information embedding unit for embedding digital watermark information in said character by using a ratio of character line thicknesses for said character in at least two of said predetermined set of directions.

11. The digital watermarking device according to claim 10, wherein
the feature detection unit detects, for each direction, an average local line thickness or the most frequently appearing local line thickness in said direction for use as character line thickness in said direction, and
the information embedding unit embeds the digital watermark information by adjusting the thickness of the lines of said character that are of said at least two directions.

12. The digital watermarking device according to claim 11, wherein said adjusting is carried out in more than one step.

13. The digital watermarking device according to claim 10, wherein the feature detection unit detects a direction each of said lines using a degree of peripheral direction contributivity.

14. The digital watermarking device according to claim 10, wherein the information embedding unit determines whether to embed the digital watermark information in the character on a basis of features detected by the feature detection unit and stops embedding the digital watermark information or adjusts embedding strength, depending on the determination result.

15. The digital watermarking device according to claim 12, further comprising an area division unit for dividing said character into a plurality of areas and specifying the plurality of areas as embedding target data, and
wherein the feature detection unit determines features of a character part existing in each of the plurality areas specified as embedding target data by the area division unit.

16. The digital watermarking device according to claim 15, wherein the information embedding unit adjusts embedding strength of the digital watermark information to be embedded in each area divided by the area division unit.

17. The digital watermarking device according to claim 10, further comprising:
a data input unit for inputting embedding target data in which the digital watermark information is to be embedded;
a text detection unit for detecting a text area composed of a characters from embedding target data inputted by the data input unit; and
a character extraction unit for extracting a character from the text area detected by the text area detection unit,
wherein the feature detection unit determines features of the character extracted by the character extraction unit.

18. A digital watermark detection device for detecting the digital watermark information from a digitally watermarked image in which digital watermark information is embedded, comprising:
an image input unit for inputting the digitally watermarked image;
a text area detection unit for detecting a text area composed of characters from a digitally watermarked image inputted by the image inputting unit;
a character extraction unit for extracting a character from the text area detected by the text area detection unit;
a structure analysis unit for analyzing said character to obtain directions of lines composing said character and character line thickness of said character with respect to each of said directions; and
an information extraction unit for extracting digital watermark information embedded in the character by calculating a ratio of the character line thicknesses of said character with respect to at least two of said directions.

19. A digital watermarking method implemented in a digital watermarking device for embedding digital watermark information in text data to generate a digitally watermarked image, comprising:
detecting local line thickness at each pixel on lines composing a character from embedding target data with respect to each of a predetermined set of the directions;
determining character line thickness for said character with respect to each of said predetermined set of the directions from said local line thickness as features of said character; and
embedding digital watermark information in said character by using a ratio of character line thicknesses for said character in at least two of said predetermined set of directions.

20. A digital watermark extraction method implemented in a digital watermarking device for embedding digital watermark information in text data to generate a digitally watermarked image, comprising:
inputting the digitally watermarked image;
detecting a text area composed of characters from a digitally watermarked image inputted by the inputting;
extracting a character from the text area detected by the detecting;
analyzing said character to obtain directions of lines composing said character and character line thickness of said character with respect to each of said directions; and
extracting digital watermark information embedded in the character by calculating a ratio of the character line thicknesses of said character with respect to at least two of said directions.

* * * * *

UNITED STATES PATENT AND TRADEMARK OFFICE
CERTIFICATE OF CORRECTION

| | |
|---|---|
| PATENT NO. | : 8,077,910 B2 |
| APPLICATION NO. | : 12/109914 |
| DATED | : December 13, 2011 |
| INVENTOR(S) | : Kensuke Kuraki et al. |

Page 1 of 1

It is certified that error appears in the above-identified patent and that said Letters Patent is hereby corrected as shown below:

Column 13, Line 52, In Claim 15, delete "claim 12," and insert -- claim 10, --, therefor.

Column 14, Line 6, In Claim 17, after "of" delete "a".

Signed and Sealed this
Twenty-first Day of February, 2012

David J. Kappos
*Director of the United States Patent and Trademark Office*